(12) United States Patent
Chang et al.

(10) Patent No.: US 11,368,070 B2
(45) Date of Patent: Jun. 21, 2022

(54) FLYWHEEL ENERGY STORAGE FAN

(71) Applicant: ASIA VITAL COMPONENTS CO., LTD., New Taipei (TW)

(72) Inventors: Bor-Haw Chang, New Taipei (TW); Yu-Tzu Chen, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 324 days.

(21) Appl. No.: 16/531,130

(22) Filed: Aug. 5, 2019

(65) Prior Publication Data
US 2021/0044175 A1 Feb. 11, 2021

(51) Int. Cl.
| | |
|---|---|
| *H02K 7/02* | (2006.01) |
| *F04D 19/00* | (2006.01) |
| *H02K 7/18* | (2006.01) |
| *F04D 29/056* | (2006.01) |

(52) U.S. Cl.
CPC .......... *H02K 7/025* (2013.01); *F04D 19/002* (2013.01); *H02K 7/1807* (2013.01); *F04D 29/056* (2013.01)

(58) Field of Classification Search
CPC ............ H02K 7/00; H02K 7/02; H02K 7/025; H02K 7/09; H02K 7/14; H02K 7/18; H02K 7/1807; F04D 25/00; F04D 25/06; F04D 25/061; F04D 25/0613; F04D 19/00; F04D 19/002
See application file for complete search history.

(56) References Cited

U.S. PATENT DOCUMENTS

| | | | | |
|---|---|---|---|---|
| 5,065,060 | A * | 11/1991 | Takahashi | H02K 7/025 310/67 R |
| 6,172,435 | B1 * | 1/2001 | Tanaka | H02K 7/086 310/90 |
| 6,794,776 | B1 * | 9/2004 | Gabrys | H02K 7/025 310/90.5 |
| 6,921,998 | B2 | 7/2005 | Giles et al. | |

(Continued)

FOREIGN PATENT DOCUMENTS

| | | |
|---|---|---|
| CN | 101924418 A | 12/2010 |
| CN | 202273889 U | 6/2012 |

(Continued)

OTHER PUBLICATIONS

Search Report dated Nov. 19, 2019 issued by Taiwan Intellectual Property Office for counterpart application No. 108124730.

(Continued)

*Primary Examiner* — Tran N Nguyen
(74) *Attorney, Agent, or Firm* — Demian K. Jackson; Jackson IPG PLLC (57) ABSTRACT

A flywheel energy storage fan includes a base seat, a fan electrical apparatus serving as a motor or a generator and a flywheel energy storage device having a flywheel rotary body. The base seat has a case section and a central column section disposed on the case section. The case section has a vacuumed chamber and a bearing cup disposed in the vacuumed chamber. The fan electrical apparatus has a rotational shaft. The rotational shaft is rotatably disposed in the central column section and the bearing cup. The flywheel rotary body is disposed on the rotational shaft in the vacuumed chamber. The flywheel energy storage fan is able to save electrical energy.

14 Claims, 9 Drawing Sheets

(56) References Cited

U.S. PATENT DOCUMENTS

9,325,217 B2 *    4/2016   Veltri .................... F16C 39/063
2005/0276693 A1   12/2005   Liu
2018/0006539 A1    1/2018   Sanders et al.

FOREIGN PATENT DOCUMENTS

| CN | 202579313 U | 12/2012 |
| CN | 203764158 U | 8/2014 |
| CN | 103731068 B | 9/2015 |
| CN | 103904816 B | 8/2016 |
| PH | 1201750125 A1 | 6/2019 |
| TW | 154632 | 3/1991 |
| TW | M331839 U | 5/2008 |
| TW | 201810873 A | 3/2018 |
| TW | M585447 U | 10/2019 |

OTHER PUBLICATIONS

Search Report dated Jun. 2, 2020 issued by China National Intellectual Property Administration for counterpart application No. 2019106305893.

Search Report dated Feb. 18, 2021 issued by China National Intellectual Property Administration for counterpart application No. 2019106305893.

* cited by examiner

FLYWHEEL ENERGY STORAGE FAN

BACKGROUND OF THE INVENTION

1. Field of the Invention

The present invention relates generally to a flywheel energy storage fan, and more particularly to a flywheel energy storage fan, which is able to save electrical energy.

2. Description of the Related Art

In order to effectively save energy, most of the current information and communication equipments will control and vary the rotational speed of the internal cooling fan in accordance with the heat dissipation requirement in peak time and off-peak time. In the conventional cooling fan, a processor on the motherboard is used to directly control the voltage output or control/adjust the acceleration/deceleration of the fan by means of pulse width modulation (PWM). The conventional cooling fan is equipped with a motor. When powered on, the motor can directly convert the electrical energy into mechanical energy of the fan, whereby the cooling fan can rotate to create airflow to forcedly dissipate the heat generated by a heat generation component. However, this leads to another problem. That is, the conventional cooling fan can only one-way convert the electrical energy into mechanical energy so that when the cooling fan is decelerated, the energy cannot be effectively reused. As a result, the energy is directly lost in vain to cause waste and the electrical energy cannot be saved.

SUMMARY OF THE INVENTION

It is therefore a primary object of the present invention to provide a flywheel energy storage fan, which is able to save electrical energy.

It is a further object of the present invention to provide the above flywheel energy storage fan, which includes a flywheel energy storage device. The flywheel energy storage device is drivable by the fan to rotate so as to synchronously store the mechanical energy and convert the mechanical energy into electrical energy to feed back to the fan for use. Accordingly, the energy can be effectively utilized.

To achieve the above and other objects, the flywheel energy storage fan of the present invention includes a base seat, a fan electrical apparatus serving as a motor or a generator and a flywheel energy storage device having a flywheel rotary body. The base seat has a case section and a central column section disposed on the case section. The case section has a vacuumed chamber and a bearing cup disposed in the vacuumed chamber. The fan electrical apparatus has a fan stator and a fan rotor rotatable relative to the fan stator. The fan stator is disposed around the central column section. The fan rotor has a fan impeller and a rotational shaft. One end of the rotational shaft is fixed to the fan impeller. The other end of the rotational shaft is rotatably disposed in the central column section and the bearing cup. The flywheel rotary body is disposed on the rotational shaft in the vacuumed chamber. The flywheel energy storage device has a flywheel rotary body. The flywheel rotary body is disposed on the rotational shaft in the vacuumed chamber. The flywheel energy storage fan of the present invention is able to effectively save electrical energy and fully utilize energy.

Still to achieve the above and other objects, the flywheel energy storage fan of the present invention includes a base seat, a fan motor and a flywheel energy storage device. The base seat has a case section and a central column section disposed on the case section. The case section has a vacuumed chamber and a bearing cup disposed in the vacuumed chamber. The fan motor has a fan stator and a fan rotor rotatable relative to the fan stator. The fan stator is disposed around the central column section. The fan rotor has a fan impeller and a rotational shaft. One end of the rotational shaft is fixed to the fan impeller. The other end of the rotational shaft is rotatably disposed in the central column section and the bearing cup. The flywheel energy storage device has a flywheel rotary body and an electrical apparatus serving as a motor or a generator. The flywheel rotary body is disposed on the rotational shaft in the vacuumed chamber. The electrical apparatus is disposed in the vacuumed chamber corresponding to the flywheel rotary body. The flywheel energy storage fan of the present invention is able to effectively save electrical energy and fully utilize energy.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
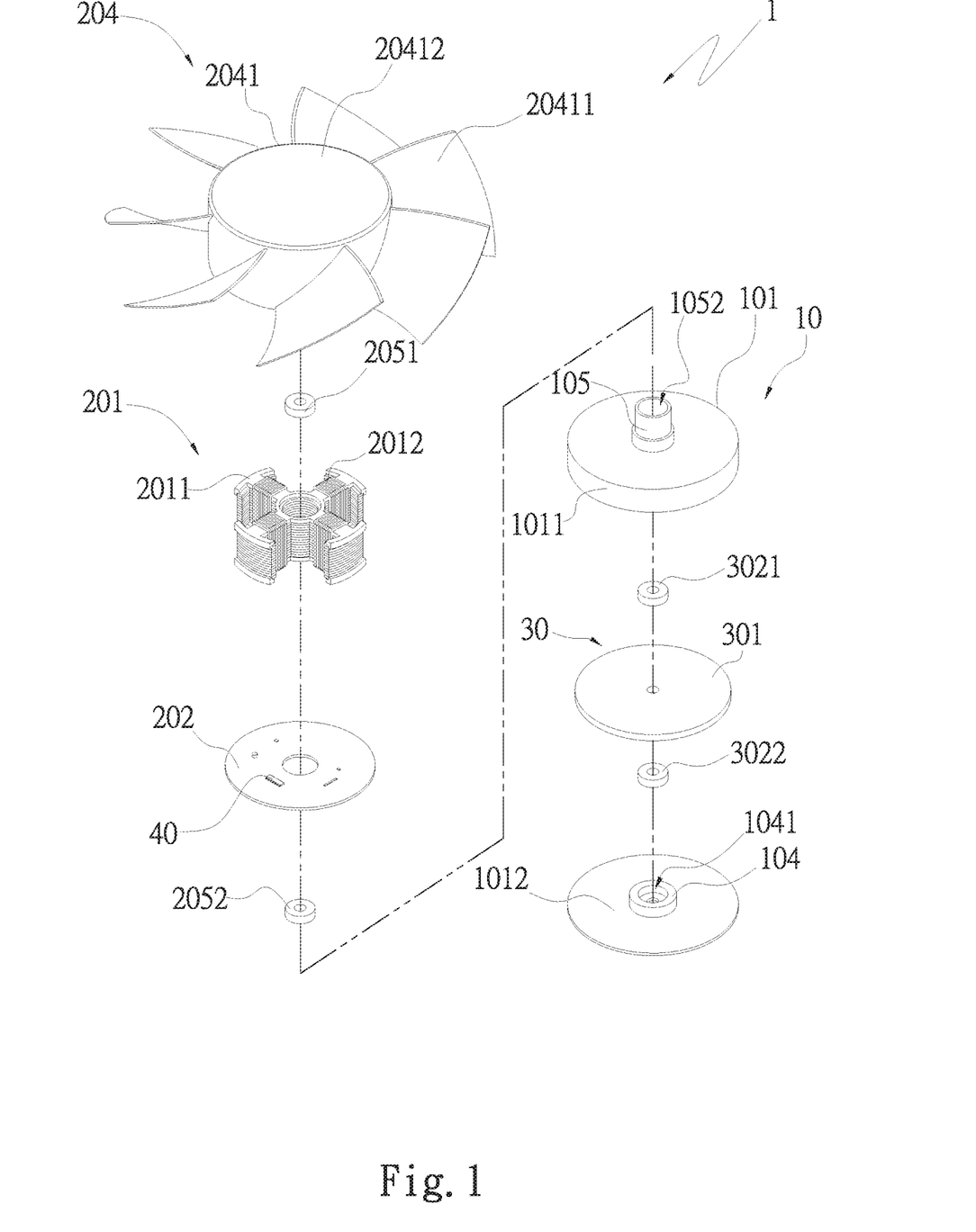
FIG. 1 is a perspective exploded view of a first embodiment of the present invention.
Figure 2:
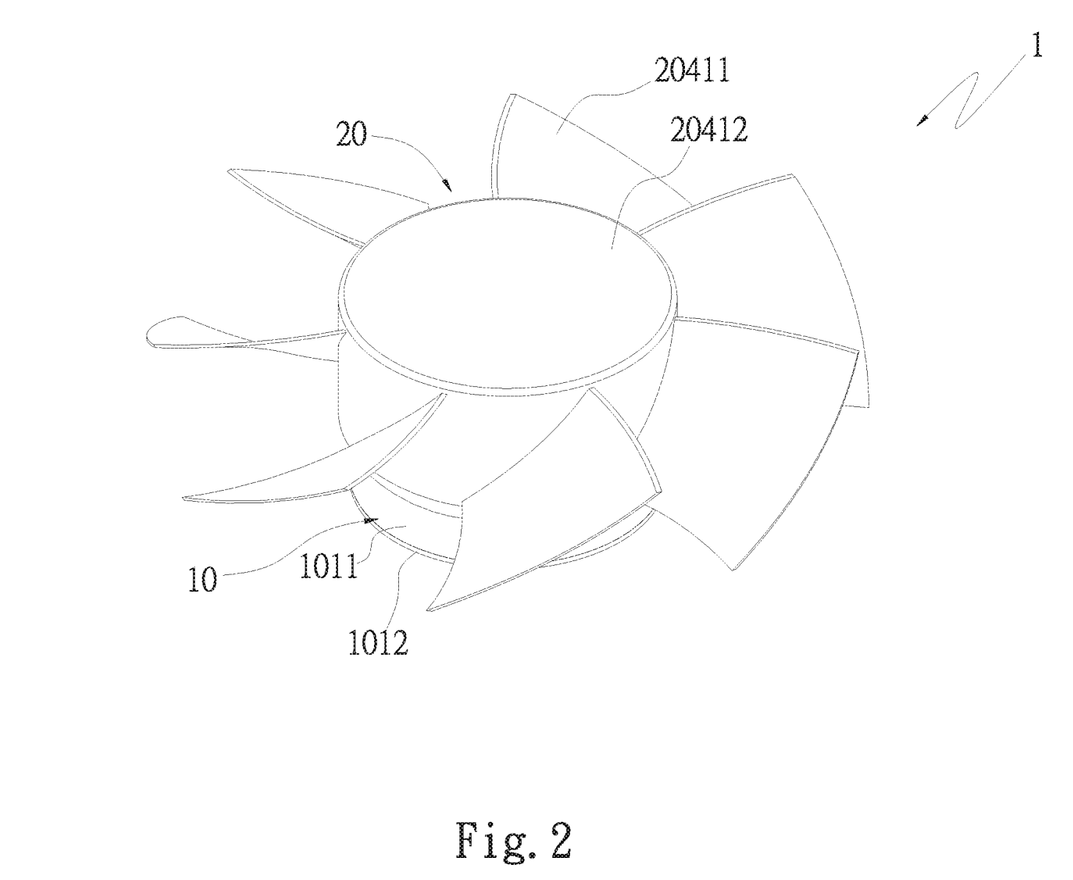
FIG. 2 is a perspective assembled view of the first embodiment of the present invention.
Figure 2A:
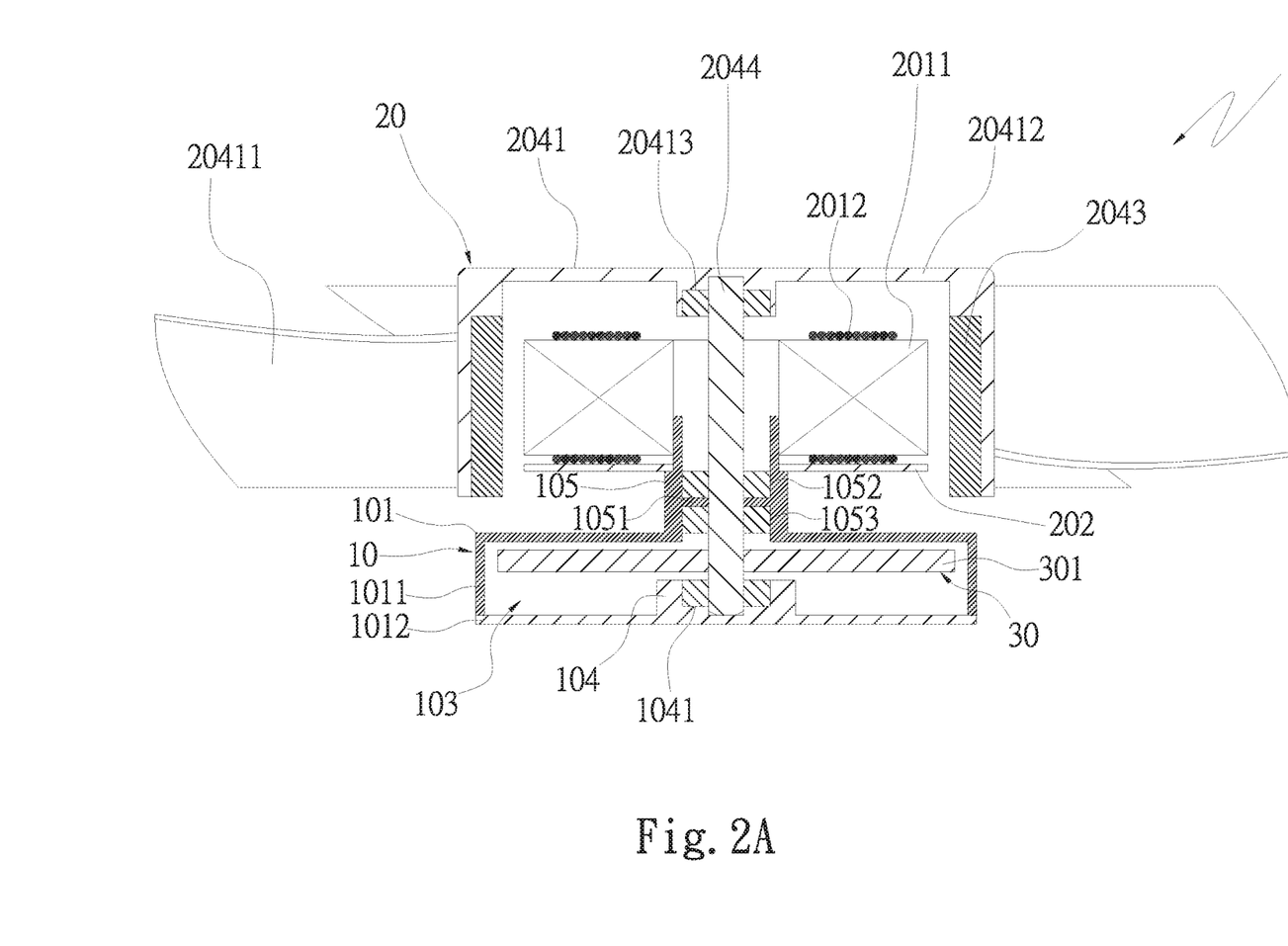
FIG. 2A is a sectional assembled view of the first embodiment of the present invention.
Figure 3:
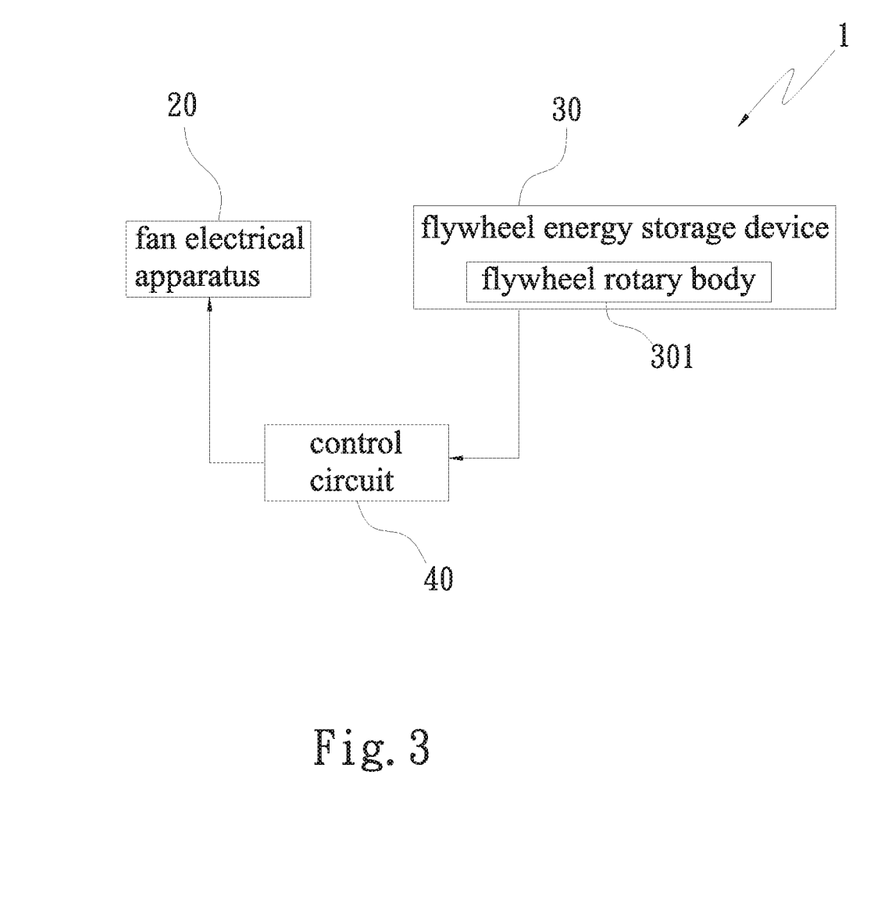
FIG. 3 is a block diagram of the first embodiment of the present invention.

Please refer to FIGS. 1 to 3. FIG. 1 is a perspective exploded view of a first embodiment of the present invention. FIG. 2 is a perspective assembled view of the first embodiment of the present invention. FIG. 2A is a sectional assembled view of the first embodiment of the present invention. FIG. 3 is a block diagram of the first embodiment of the present invention. In this embodiment, the flywheel energy storage fan 1 is, but not limited to, an axial-flow fan (hereinafter referred to as fan for short). In practice, the flywheel energy storage fan 1 can be alternatively a centrifugal fan or any other fan capable of creating airflow, (such as cross-flow fan, forced draft fan or mixed-flow fan). The flywheel energy storage fan 1 includes a base seat 10, a fan electrical apparatus 20 serving as a motor or a generator and a flywheel energy storage device 30. The base seat 10 has a case section 101 and a central column section 105. The case section 101 has a vacuumed chamber 103, an outer case 1011, a bottom board 1012 and a bearing cup 104 disposed in the vacuumed chamber 103. The outer case 1011 is overlaid on the bottom board 1012 to cover the same. The central column section 105 is disposed on an upper side of the outer case 1011 in alignment with the bearing cup 104. The central column section 105 is a part of the case. A diaphragm 1051 is disposed in the central column section 105. The central column section 105 has a top end and a bottom end. The diaphragm 1051 and the top end and the bottom end of the central column section 105 respectively define a first room 1052 and a second room 1053. The first and second rooms 1052, 1053 respectively receive a second rotor bearing 2052 and a first bearing 3021. The outer case 1011 and the bottom board 1012 and the central column section 105 together define the vacuumed chamber 103. In this embodiment, the vacuumed chamber 103 extends from the lower side of the diaphragm 1051 of the central column section 105 to the inner sides of the outer case 1011 and the bottom board 1012 to define the vacuumed chamber 103 in vacuumed state.

The bearing cup 104 is disposed at the center of the inner side of the bottom board 1012 in the vacuumed chamber 103. The bearing cup 104 has a receiving hole 1041 for receiving a second bearing 3022. The first and second bearings 3021, 3022 are oppositely positioned in the vacuumed chamber 103 of the case section 101. The fan electrical apparatus 20 includes a fan stator 201 and a fan rotor 204 rotatable relative to the fan stator 201. The fan stator 201 is disposed around the central column section 105. The fan stator 201 has a silicon steel sheet assembly 2011, a winding set 2012 wound around the silicon steel sheet assembly 2011 and a circuit board 202. A control circuit 40 is disposed on the circuit board 202. The control circuit 40 includes a processor (such as central processing unit, microcontroller unit or digital signal processor) and other electronic components (such as drive switch component or Hall element). The circuit board 202 (such as flexible printed circuit board or rigid printed circuit board) is electrically connected with the winding set 2012 of the fan stator 201. Moreover, such as a microcontroller unit (MCU) on the circuit board 202 serves to control the on/off, rotational speed (such as acceleration or deceleration) or other operations of the fan electrical apparatus 20. The fan rotor 204 has a fan impeller 2041, a rotational shaft 2044 and a magnetic member 2043. One end of the rotational shaft 2044 is fixed to the fan impeller 2041. The other end of the rotational shaft 2044 is rotatably disposed in the central column section 105 and the bearing cup 104. In this embodiment, a sealing member (such as a sealing ring, not shown) is disposed between the rotational shaft 2044 and the diaphragm 1051. The sealing member is sealedly connected with the rotational shaft 2044 so as to isolate the vacuumed chamber 103 of the case from the exterior and effectively keep the vacuumed chamber 103 in vacuumed state.

The fan impeller 2041 has a receiving hole 20413 for receiving a first rotor bearing 2051. The first and second rotor bearings 2051, 2052 and the first and second bearings 3021, 3022 are rotatably disposed around the rotational shaft 2044 and coaxial with the rotational shaft 2044. The first and second rotor bearings 2051, 2052 and the first and second bearings 3021, 3022 serve to support the fan rotor 204. The fan impeller 2041 has multiple blades 20411 and a hub 20412. The blades 20411 are annularly arranged on the outer circumference of the hub 20412. The magnetic member 2043 (such as a magnet or a permanent magnet) is disposed on the inner circumference of the hub 20412 to face the fan stator 201 on the central column section 105. The flywheel energy storage device 30 and the fan rotor 204 are both disposed on the rotational shaft 2044 and coaxial with each other. The flywheel energy storage device 30 has a flywheel rotary body 301. In this embodiment, the flywheel rotary body 301 is, but not limited to, made of metal material (such as alloy steel material, iron material, titanium alloy material or any other metal material). In practice, the flywheel rotary body 301 can be alternatively made of a complex material (such as a complex material of fiber carbon and resin), plastic material or ceramic material. The flywheel energy storage device 30 can have a size larger than, equal to or smaller than the size of the fan electrical apparatus 20.

The flywheel rotary body 301 is disposed on the rotational shaft 2044 in the vacuumed chamber 103. In this embodiment, the flywheel rotary body 301 is a substantially disc-shaped body. In the case that the fan electrical apparatus 20 serves as a motor, the flywheel rotary body 301 is driven and accelerated by the fan electrical apparatus 20 to rotate at high speed so as to store energy in the form of rotational dynamic energy (or so-called mechanical energy). Alternatively, in the case that the fan electrical apparatus 20 serves as a generator, the flywheel rotary body 301 releases energy to drive the generator to rotate. When the speed of the flywheel rotary body 301 is gradually lowered, the dynamic energy is converted into electrical energy for the fan electrical apparatus 20 to continuously serve as a motor. Accordingly, the energy is effectively utilized to maximize the profit. In a modified embodiment, the flywheel rotary body 301 substantially has the form of a thin wheel ring or a hollow disc or any other configuration (such as a flat disc with the hub 20412). In another modified embodiment, the flywheel rotary body 301 can be rotatably disposed on the rotational shaft via a bearing (such as a mechanical bearing or a magnetic bearing).

When the fan (such as axial-flow fan) receives input power (such as DC power) and is powered on, the processor controls and drives the fan electrical apparatus 20 to operate as a motor. At the same time, the fan electrical apparatus 20 will drive the flywheel rotary body 301 in the vacuumed chamber 103 to rotate. The flywheel rotary body 301 rotates at high speed in the vacuumed chamber 103 in a vacuumed state so that the fan can operate without any load. The flywheel rotary body 301 is driven by the fan electrical apparatus 20 to rotate and store the dynamic energy in the flywheel rotary body 301. At this time, in case the fan is decelerated, the flywheel rotary body 301 will synchronously decelerate, whereby the flywheel rotary body 301 will drive the fan electrical apparatus 20 to rotate as a generator. The generator can generate electrical energy to directly feed back to the control circuit 40 to use. Accordingly, the control circuit 40 can utilize the electrical energy supplied by the generator to perform any operation processing or other control (such as increasing the rotational speed of the fan). The flywheel rotary body 301 of the flywheel energy storage device 30 has large energy storage density, high energy conversion efficiency, fast charging/discharging and long lifetime. Therefore, in the operation and acceleration/deceleration of the fan, the energy can be effectively converted and utilized to achieve better energy and power saving effect. In practice, when the fan is powered on to operate, the control circuit 40 receives the electrical energy provided (or generated) by the fan electrical apparatus 20 as a generator. At this time, the processor of the control circuit 40 can control the input power temporarily not to provide for the fan electrical apparatus 20. In the case the processor of the control circuit 40 detects that the electrical energy provided by the fan electrical apparatus 20 as a generator is slightly insufficient to drive the fan or the fan is accelerated, the processor of the control circuit 40 controls and permits the input power to continuously provide for the fan electrical apparatus 20. Accordingly, the fan can keep a stable rotational speed and a stable output air volume and the energy can be effectively utilized.

Accordingly, the flywheel energy storage fan 1 of the present invention is able to effectively save electrical energy and fully utilize energy. In addition, the flywheel energy storage device 30 and the fan electrical apparatus 20 of the fan can be commonly used.

Figure 4:
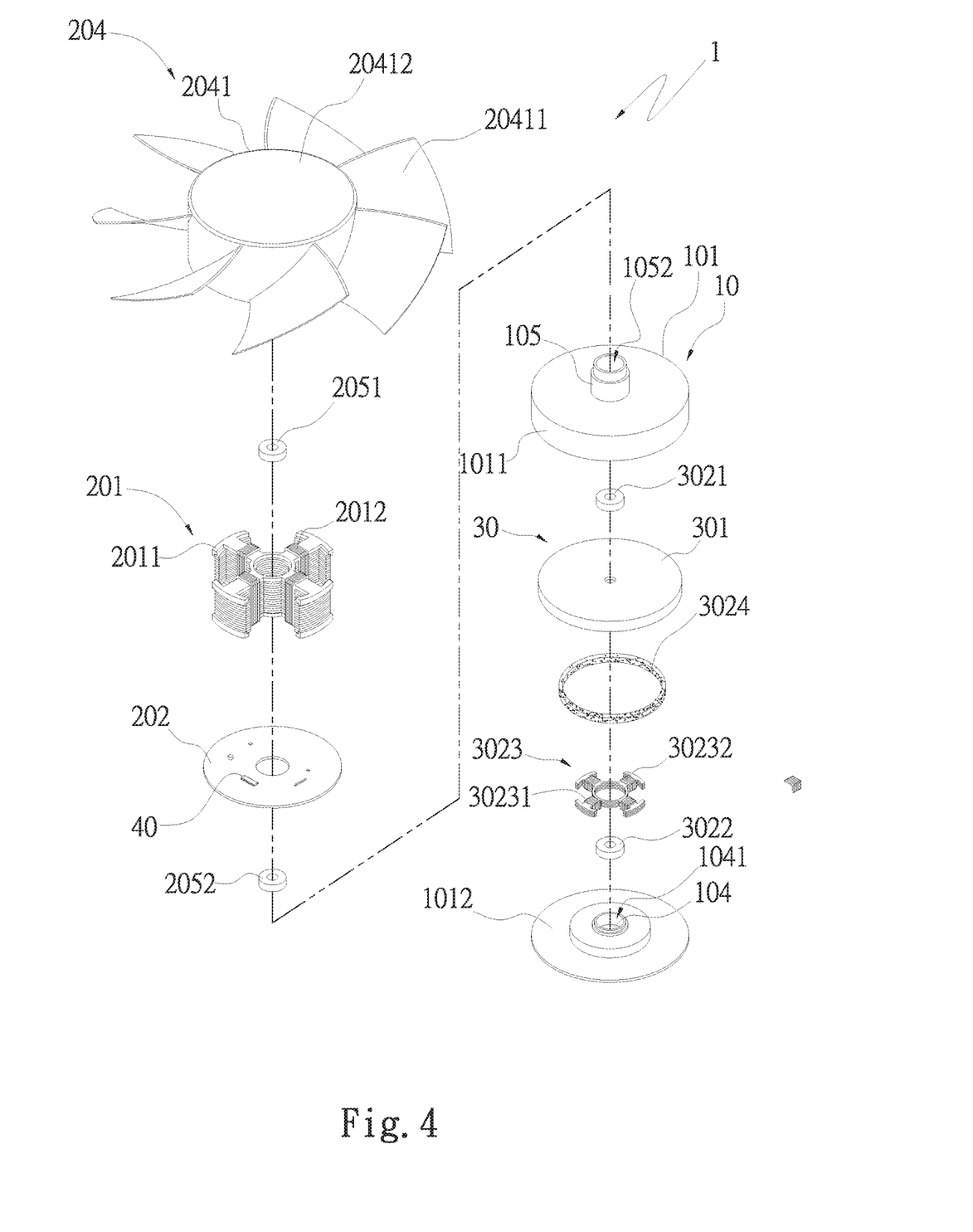
FIG. 4 is a perspective exploded view of a second embodiment of the present invention.
Figure 5:
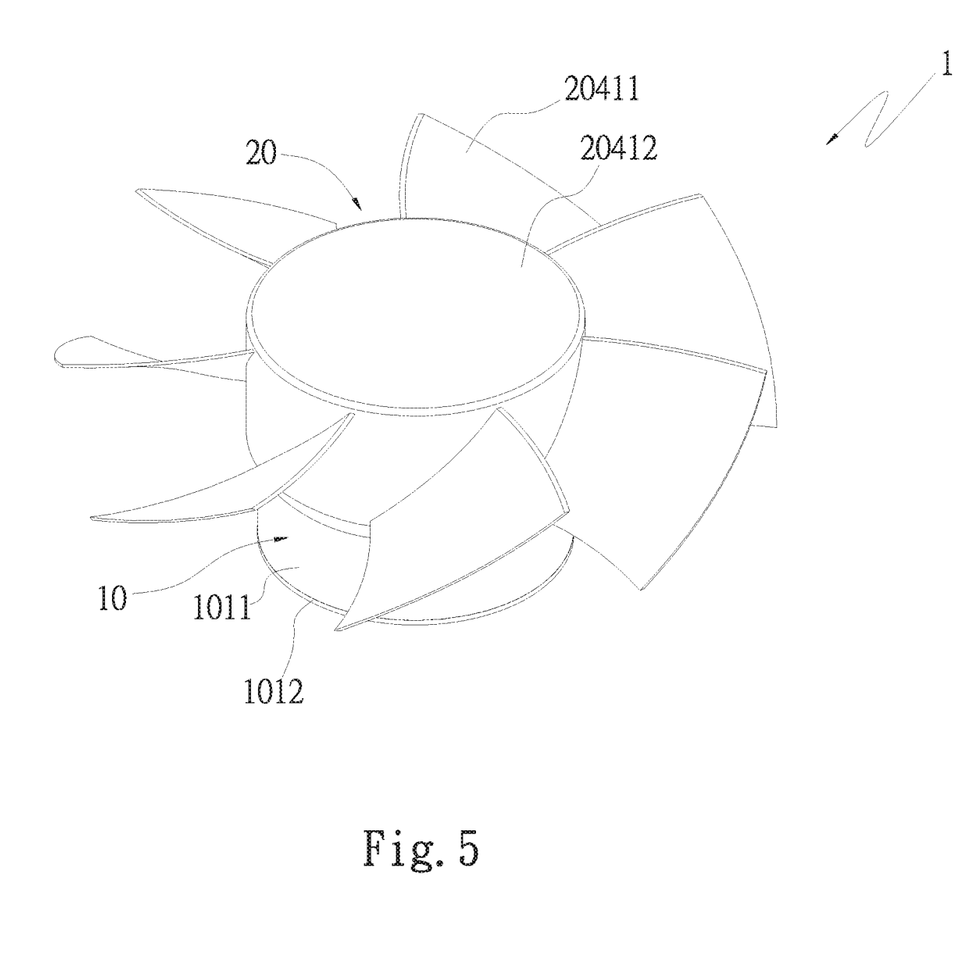
FIG. 5 is a perspective assembled view of the second embodiment of the present invention.
Figure 5A:
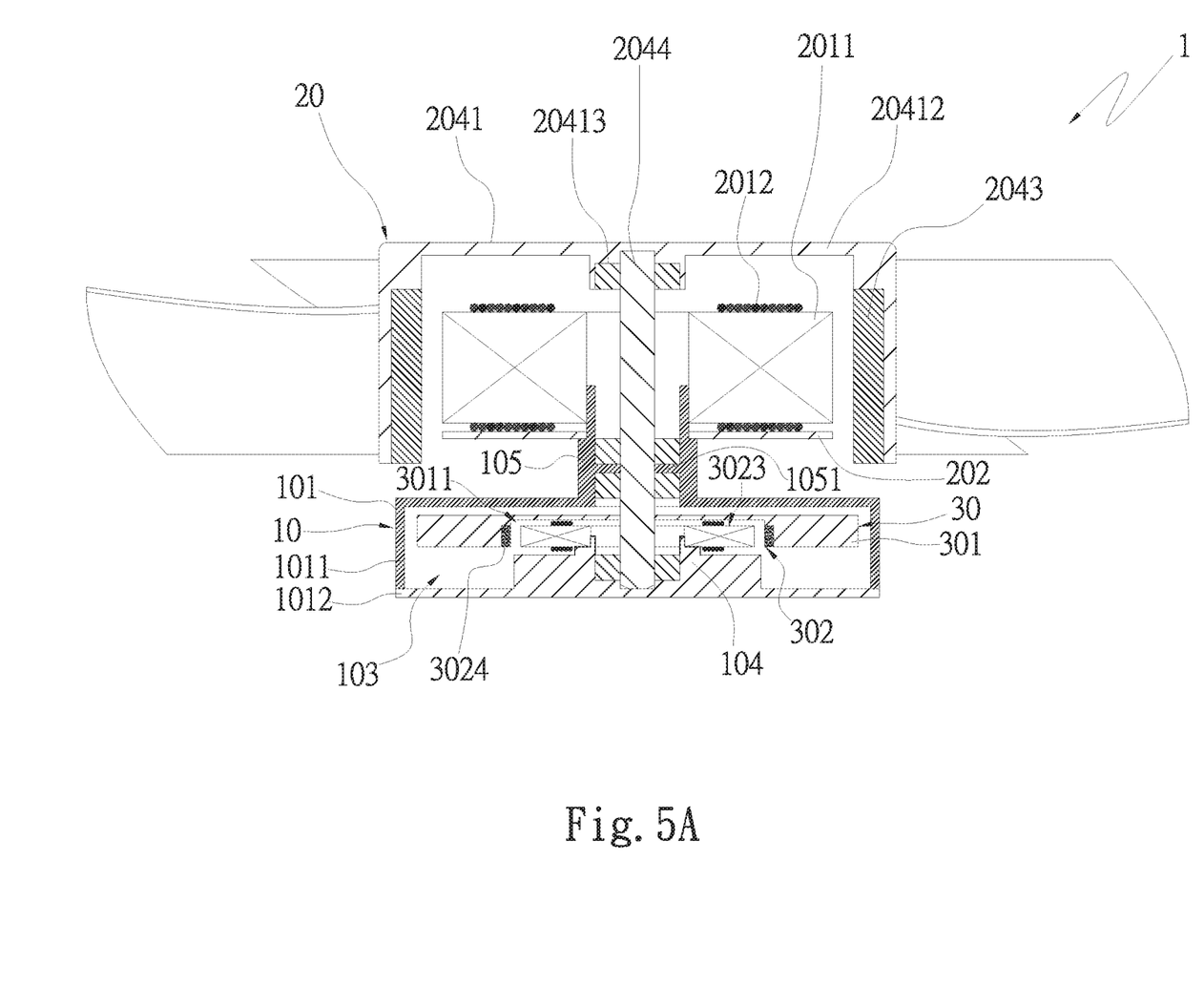
FIG. 5A is a sectional assembled view of the second embodiment of the present invention.
Figure 5B:
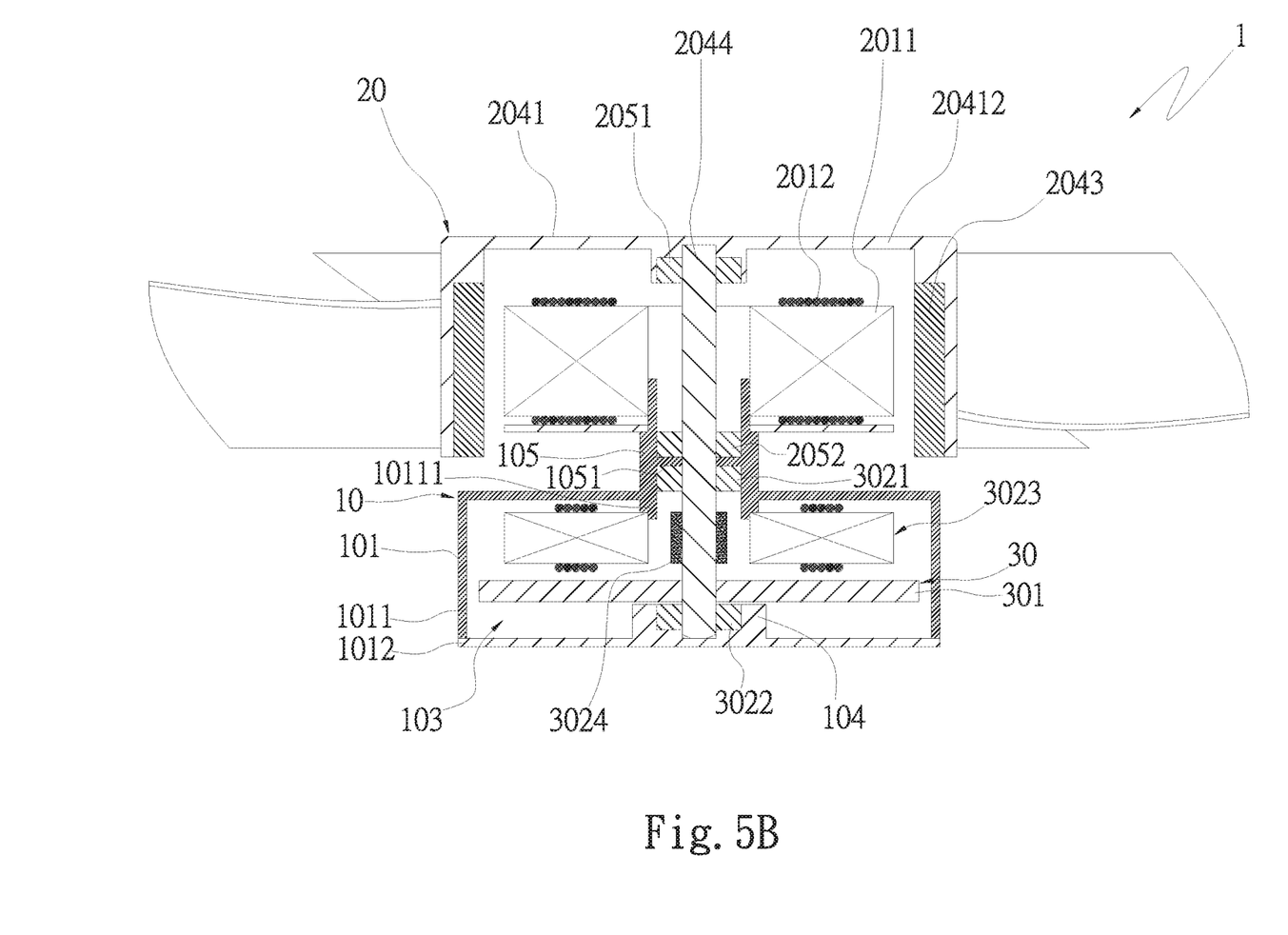
FIG. 5B is a sectional assembled view of a modified embodiment of the second embodiment of the present invention.
Figure 6:
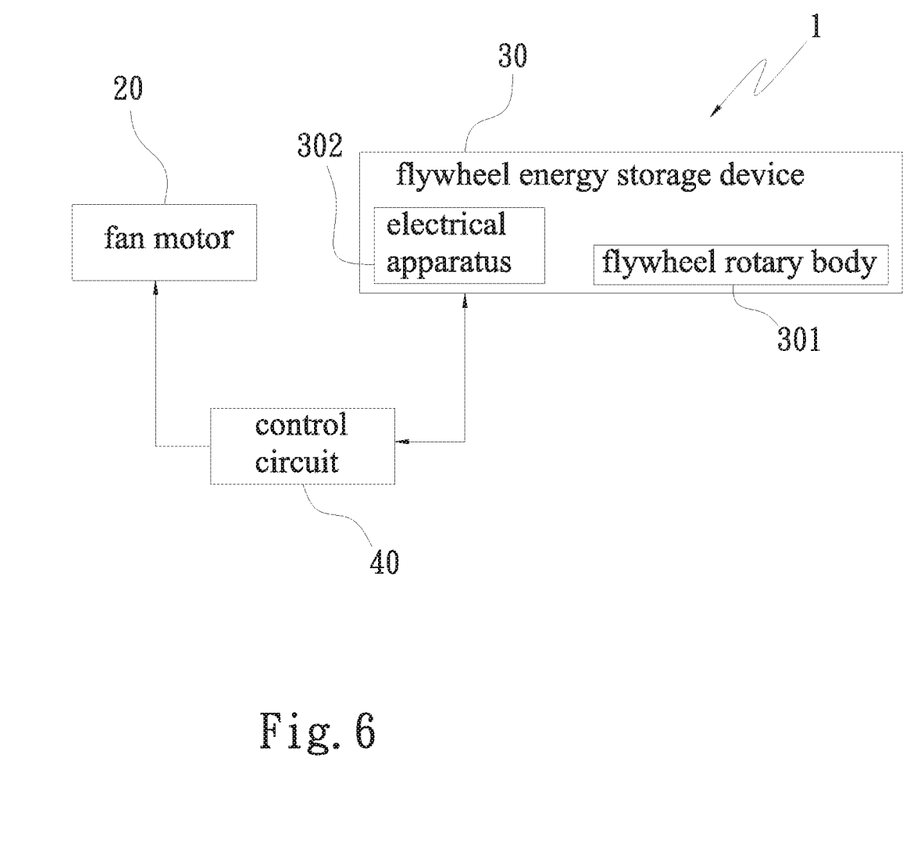
FIG. 6 is a block diagram of the second embodiment of the present invention.

Please now refer to FIGS. 4, 5, 5A, 5B and 6. FIG. 5 is a perspective assembled view of the second embodiment of the present invention. FIG. 5A is a sectional assembled view of the second embodiment of the present invention. FIG. 5B is a sectional assembled view of a modified embodiment of the second embodiment of the present invention. FIG. 6 is a block diagram of the second embodiment of the present invention. The second embodiment is different from the first embodiment in that in the first embodiment, the flywheel energy storage device 30 and the fan electrical apparatus 20 of the fan are commonly used, while in the second embodiment, the fan electrical apparatus 20 is not commonly used by the flywheel energy storage device 30 and the fan. In the second embodiment, the fan electrical apparatus 20 that serves as both a generator and a motor in the first embodiment is replaced with a fan motor 20 for driving the fan to operate. In order to facilitate illustration, the fan electrical apparatus 20 in the first embodiment is renamed as the fan motor 20. As shown in the drawings, the flywheel energy storage fan 1 includes a base seat 10, a fan motor 20 and a flywheel energy storage device 30. The base seat 10 has a case section 101 and a central column section 105. In this embodiment, the structure, connection relationship and effect of the base seat 10 (including the case section 101, the outer case 1011, the bottom board 1012, the vacuumed chamber 103, the bearing cup 104 and the central column section 105) are substantially identical to the structure, connection relationship and effect of the base seat 10 of the first embodiment (including the case section 101, the outer case 1011, the bottom board 1012, the vacuumed chamber 103, the bearing cup 104 and the central column section 105) and thus will not be redundantly described hereinafter.

In this embodiment, the fan motor 20 is a motor for driving the fan (such as axial-flow fan) to operate. The fan motor 20 includes a fan stator 201 and a fan rotor 204 rotatable relative to the fan stator 201. The fan rotor 204 has a fan impeller 2041 having a hub 20412 and multiple blades 20411, a rotational shaft 2044 and a magnetic member 2043. The fan stator 201 has a silicon steel sheet assembly 2011, a winding set 2012 wound around the silicon steel sheet assembly 2011 and a circuit board 202. A control circuit 40 and other electronic components are disposed on the circuit board 202. In this embodiment, the structure, connection relationship and effect of the fan motor 20 (including the fan stator 201, the silicon steel sheet assembly 2011, the winding set 2012, the circuit board 202, the control circuit 40, the other electronic components, the fan rotor 204, the fan impeller 2041 having the hub 20412 and the multiple blades 20411, the rotational shaft 2044 and the magnetic member 2043) are substantially identical to the structure, connection relationship and effect of the fan electrical apparatus 20 of the first embodiment (including the fan stator 201, the silicon steel sheet assembly 2011, the winding set 2012, the circuit board 202, the control circuit 40, the other electronic components, the fan rotor 204, the fan impeller 2041 having the hub 20412 and the multiple blades 20411, the rotational shaft 2044 and the magnetic member 2043). The second embodiment is different from the first embodiment in that in the second embodiment, the circuit board 202 (such as flexible printed circuit board 202 or rigid printed circuit board 202) is electrically connected with the winding set 2012 of the fan motor 20 and a winding set 30232 of an electrical apparatus 302 of the flywheel energy storage device 30.

The flywheel energy storage device 30 has a flywheel rotary body 301 and an electrical apparatus 302 serving as a motor and a generator. The flywheel rotary body 301 is disposed on the rotational shaft 2044 in the vacuumed chamber 103 corresponding to the electrical apparatus 302. The electrical apparatus 302 of the flywheel energy storage device 30 and the fan motor 20 are both disposed on the rotational shaft 2044. In this embodiment, the structure, the configuration and the material of the flywheel rotary body 301 are identical to the structure, the configuration and the material of the flywheel rotary body 301 of the first embodiment. When the fan motor 20 (or both the fan motor 20 and the electrical apparatus 302) drive the rotational shaft 2044, the flywheel rotary body 301 is driven by the rotational shaft 2044 to rotate therewith. At this time, the flywheel rotary body 301 is accelerated to rotate at high speed so as to store energy in the form of rotational dynamic energy (or so-called mechanical energy). Alternatively, when the fan motor 20 is decelerated, the flywheel rotary body 301 will release energy to drive the electrical apparatus 302 in the vacuumed chamber 103 to rotate. When the speed is gradually lowered, the dynamic energy is converted into electrical energy for the fan motor 20 to continuously use. Accordingly, the energy is effectively utilized to maximize the profit.

The electrical apparatus 302 has an electrical apparatus stator 3023 and an electrical apparatus rotor 3024 (or so-called flywheel rotor). The electrical apparatus stator 3023 is fixed on the bearing cup 104 and positioned in a recess 3011 of the flywheel rotary body 301. The electrical apparatus rotor 3024 is a magnetic body (such as a magnet or a permanent magnet). In this embodiment, the magnetic body is attached to the inner circumference of the flywheel rotary body 301 corresponding to the electrical apparatus stator 2023. The electrical apparatus stator 3023 has a silicon steel sheet assembly 30231 and a winding set 30232 wound around the silicon steel sheet assembly 30231. Referring to FIG. 5B, in a modified embodiment, the electrical apparatus 302 of the flywheel energy storage device 30 is disposed above the flywheel rotary body 301 in the vacuumed chamber 103. The magnetic body (the electrical apparatus rotor) is disposed on the rotational shaft 2044 corresponding to the electrical apparatus stator 3023. The silicon steel sheet assembly 30231 with the winding set 30232 wound thereon is fixed on a protrusion section 10111 extending from the inner circumference of the outer case 1011 in adjacency to the central column section 105.

When the fan (such as axial-flow fan) receives input power (such as DC power) and is powered on, the processor controls and drives the fan motor 20 and the electrical apparatus 302 as a motor to synchronously (or the same time) operate. At this time, the rotational shaft 2044 is driven to drive the flywheel rotary body 301 in the vacuumed chamber 103 to rotate.

The flywheel rotary body 301 rotates at high speed in the vacuumed chamber 103 in a vacuumed state so that the fan can operate without any load. Then, the flywheel rotary body 301 is synchronously driven by the fan motor 20 and the electrical apparatus 302 as a motor to rotate and store the dynamic energy in the flywheel rotary body 301. At this time, in case the fan is decelerated, the flywheel rotary body 301 will synchronously decelerate, whereby the flywheel rotary body 301 will drive the electrical apparatus 302 on the rotational shaft 2044 to rotate as a generator. The generator (the electrical apparatus 302) can generate electrical energy to directly feed back to the control circuit 40 to use.

Accordingly, the control circuit 40 can utilize the electrical energy supplied (or generated) by the generator to perform any operation processing or other control (such as increasing the rotational speed of the fan). The flywheel rotary body 301 of the flywheel energy storage device 30 has large energy storage density, high energy conversion efficiency, fast charging/discharging and long lifetime. Therefore, in the operation and acceleration/deceleration of the fan, the energy can be effectively converted and utilized to achieve better energy and power saving effect.

In practice, when the fan is powered on to operate, the control circuit 40 receives the electrical energy generated by the electrical apparatus 302 as a generator. At this time, the processor of the control circuit 40 will automatically control the input power and the electrical energy generated by the generator (the electrical apparatus 302) to at the same time (or alternately) provide for the fan motor 20 to use or automatically turn off without receiving the input power and only the generator generates and provides electrical energy for the fan motor 20 to use. For example, in the case the processor (not shown) of the control circuit 40 detects that the voltage of the input power is unstable, the processor controls and permits the electrical energy of the generator and the input power to both provide for the fan motor 20. In the case the processor judges that the voltage of the input power is stable, the processor controls the electrical energy of the generator not to provide for the fan motor 20. Accordingly, the fan can keep a stable rotational speed and a stable output air volume and the energy can be effectively utilized to save energy and power. In addition, in the case the control circuit 40 detects that the electrical energy generated by the electrical apparatus 302 as a generator is slightly insufficient to continuously drive the fan or the fan is accelerated, the processor of the control circuit 40 will automatically control the input power to actively provide for the fan motor 20 to use. In a modified embodiment, according to the requirements for air volume, heat dissipation and energy-saving of the fan, a user can previously design the processor to control and drive the fan motor 20 and the electrical apparatus 302 as a motor to synchronously power on and operate or only control the fan motor 20 to power on and operate and the electrical apparatus 302 as a motor not to power on and operate.

Accordingly, the flywheel energy storage fan 1 of the present invention is able to effectively save electrical energy and fully utilize energy.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. A flywheel energy storage fan comprising:
   a base seat having a case section and a central column section disposed on the case section, the case section having a vacuumed chamber and a bearing cup disposed in the vacuumed chamber;
   a fan electrical apparatus serving as a motor or a generator, the fan electrical apparatus having a fan stator and a fan rotor rotatable relative to the fan stator, the fan stator being disposed around the central column section, the fan rotor having a fan impeller and a rotational shaft, one end of the rotational shaft being fixed to the fan impeller, the other end of the rotational shaft being rotatably disposed in the central column section and the bearing cup; and
   a flywheel energy storage device having a flywheel rotary body, the flywheel rotary body being disposed on the rotational shaft in the vacuumed chamber.

2. The flywheel energy storage fan as claimed in claim 1, wherein the fan impeller has a receiving hole for receiving a first rotor bearing, the fan stator being fixed around the central column section, a diaphragm being disposed in the central column section, the central column section having a top end and a bottom end, the diaphragm and the top end and the bottom end of the central column section respectively defining a first room and a second room, the first and second rooms respectively receiving a second rotor bearing and a first bearing, the rotational shaft being rotatably disposed in the first and second rotor bearings and the first bearing.

3. The flywheel energy storage fan as claimed in claim 2, wherein the bearing cup has a receiving hole for receiving a second bearing, the first and second bearings being oppositely positioned in the vacuumed chamber of the case section, the rotational shaft being rotatably disposed in the second bearing.

4. The flywheel energy storage fan as claimed in claim 1, wherein the case section has an outer case and a bottom board, the outer case being overlaid on the bottom board to cover the same, the central column section being disposed on an upper side of the outer case in alignment with the bearing cup, the outer case, the bottom board and the central column section together defining the vacuumed chamber, the bearing cup being disposed on an inner side of the bottom board in vacuumed chamber.

5. The flywheel energy storage fan as claimed in claim 1, wherein the flywheel rotary body is made of metal material, plastic material or complex material.

6. The flywheel energy storage fan as claimed in claim 1, wherein the fan impeller has multiple blades and a hub, the blades being annularly arranged on an outer circumference of the hub, the fan rotor having a magnetic member disposed on an inner circumference of the hub to face the fan stator, the fan stator having a silicon steel sheet assembly, a winding set wound around the silicon steel sheet assembly and a circuit board, a control circuit being disposed on the circuit board, the circuit board being electrically connected with the winding set.

7. A flywheel energy storage fan comprising:
   a base seat having a case section and a central column section disposed on the case section, the case section having a vacuumed chamber and a bearing cup disposed in the vacuumed chamber;
   a fan motor having a fan stator and a fan rotor rotatable relative to the fan stator, the fan stator being disposed around the central column section, the fan rotor having a fan impeller and a rotational shaft, one end of the rotational shaft being fixed to the fan impeller, the other end of the rotational shaft being rotatably disposed in the central column section and the bearing cup; and
   a flywheel energy storage device having a flywheel rotary body and an electrical apparatus serving as a motor or a generator, the flywheel rotary body being disposed on the rotational shaft in the vacuumed chamber, the electrical apparatus being disposed in the vacuumed chamber corresponding to the flywheel rotary body.

8. The flywheel energy storage fan as claimed in claim 7, wherein the fan impeller has a receiving hole for receiving a first rotor bearing, the fan stator being fixed around the central column section, a diaphragm being disposed in the central column section, the central column section having a top end and a bottom end, the diaphragm and the top end and the bottom end of the central column section respectively defining a first room and a second room, the first and second rooms respectively receiving a second rotor bearing and a first bearing, the rotational shaft being rotatably disposed in the first and second rotor bearings and the first bearing.

9. The flywheel energy storage fan as claimed in claim 8, wherein the bearing cup has a receiving hole for receiving a second bearing, the first and second bearings being oppositely positioned in the vacuumed chamber of the case section, the rotational shaft being rotatably disposed in the second bearing.

10. The flywheel energy storage fan as claimed in claim 7, wherein the case section has an outer case and a bottom board, the outer case being overlaid on the bottom board to cover the same, the central column section being disposed on an upper side of the outer case in alignment with the bearing cup, the outer case, the bottom board and the central column section together defining the vacuumed chamber, the bearing cup being disposed on an inner side of the bottom board in vacuumed chamber.

11. The flywheel energy storage fan as claimed in claim 7, wherein the electrical apparatus has an electrical apparatus stator and an electrical apparatus rotor corresponding to the electrical apparatus stator, the electrical apparatus rotor being a magnetic body disposed on the flywheel rotary body, the electrical apparatus stator being fixed on the bearing cup corresponding to the magnetic body, the electrical apparatus stator having a silicon steel sheet assembly and a winding set wound around the silicon steel sheet assembly.

12. The flywheel energy storage fan as claimed in claim 10, wherein the electrical apparatus has an electrical apparatus stator and an electrical apparatus rotor corresponding to the electrical apparatus stator, the electrical apparatus rotor being a magnetic body disposed on the rotational shaft, the electrical apparatus stator having a silicon steel sheet assembly and a winding set wound around the silicon steel sheet assembly, the silicon steel sheet assembly being fixed on a protrusion section extending from an inner circumference of the outer case in adjacency to the central column section.

13. The flywheel energy storage fan as claimed in claim 12, wherein the fan impeller has multiple blades and a hub, the blades being annularly arranged on an outer circumference of the hub, the fan rotor having a magnetic member disposed on an inner circumference of the hub to face the fan stator, the fan stator having a silicon steel sheet assembly, a winding set wound around the silicon steel sheet assembly and a circuit board, a control circuit being disposed on the circuit board, the circuit board being electrically connected with the winding set of the fan motor and the winding set of the electrical apparatus.

14. The flywheel energy storage fan as claimed in claim 7, wherein the flywheel rotary body is made of metal material, plastic material or complex material.

\* \* \* \* \*